United States Patent [19]

Peddinghaus

[11] Patent Number: 4,691,601
[45] Date of Patent: Sep. 8, 1987

[54] METHOD OF SAWING A STEEL STRUCTURAL SHAPE HAVING AT LEAST ONE FLANGE

[76] Inventor: Rolf Peddinghaus, Deterbergerstr. 25, 5828 Ennepetal, Fed. Rep. of Germany

[21] Appl. No.: 840,438

[22] Filed: Mar. 17, 1986

[30] Foreign Application Priority Data

Mar. 16, 1985 [DE] Fed. Rep. of Germany ....... 3509522

[51] Int. Cl.$^4$ ............................................. B23D 45/02
[52] U.S. Cl. ........................................ 83/56; 83/71; 83/72; 83/360
[58] Field of Search ...................... 83/71, 72, 74, 360, 83/56, 13

[56] References Cited

U.S. PATENT DOCUMENTS

| 3,789,279 | 1/1974 | Dempsy | 83/72 X |
| 4,437,367 | 3/1984 | Hauser | 83/72 X |
| 4,524,812 | 6/1985 | Murphy | 83/72 X |

Primary Examiner—Donald R. Schran
Attorney, Agent, or Firm—Karl F. Ross; Herbert Dubno

[57] ABSTRACT

A flange of a structural shape is cut by a saw apparatus with a rotary metal saw which has a specified number of sawteeth. The structural steel shape lies on a table or roller bed, clamped onto a stationary piece of equipment with a vise, within range of the metal saw. The metal saw is operated at a specified number of r.p.m. and is driven toward the projected sawcut at a specified feed speed. The speed of the cut is determined by the number of r.p.m., the number of sawteeth and the radius of the metal saw. During the sawing process the structural flange is subjected to a forced elastic deflection and is impacted by the thus required restoring force and movements of the sawteeth. These movements are determined by the tooth succession time which, in turn, depends on the number of sawteeth and the number of r.p.m. The oscillation time of the oscillation of the structural flange, which was activated by the elastic deflection, is ascertained. The metal saw is then operated at a number of r.p.m. which has a sufficiently small tooth succession time when compared to the oscillation time. The structural flange is then held fast in a deflected position by the sawteeth succeeding each other.

7 Claims, 3 Drawing Figures

METHOD OF SAWING A STEEL STRUCTURAL SHAPE HAVING AT LEAST ONE FLANGE

FIELD OF THE INVENTION

My present invention relates to a method of sawing a steel structural shape having at least one structural flange, in a saw apparatus with a rotary metal saw which has a given number of saw teeth.

BACKGROUND OF THE INVENTION

During the sawing of a steel structural shape with a rotary metal saw the beam or bar having at least one flange lies an a table or roller bed, clamped on a support on which it is fed to the metal sawblade.

The metal saw is operated at a specified speed in terms of number of revolutions per minute (r.p.m.) the blade and workpiece are translatorily relatively displaced at a specified feed speed.

The speed of the feed is determined by the number of r.p.m., the number of saw teeth and the radius of the metal saw.

During the sawing procedure the flange is subjected to a forced elastic deflection by the blade against a force by this action of the saw teeth.

These movements are determined by the tooth succession time (i.e. the time between encounters of successive teeth with the flange) and the speed.

The structural steel shapes can have H,U,I, or T cross section or an angular profile, i.e. a channel I-beam, H-beam, T-beam or angle iron.

The invention is especially advantageous when applied to the cutting of structural steel shapes as they are usually used in steel construction and especially heavy steel construction, and the metal saw is designed for this purpose.

The tooth succession time is, as noted, the small time interval which elapses between successive saw teeth engaging in the cutting procedure while the metal saw is in operation. If the number of r.p.m. within a unit of time is defined as "n" and if the number of teeth is defined as "x", then the tooth succession time is the reciprocal value of the product of number of revolutions per unit of time and the number of saw teeth, i.e. 1/xn.

In the past, forced elastic deflection of the flange led to an oscillating movement of the structural flange. The oscillation time or period of the oscillation and the tooth succession time coincide more or less, or the tooth succession time is even greater than the oscillation time. The oscillation time is the reciprocal value of the frequency of this oscillation. Actual and marked resonance phenomena appear during this process.

I have now found by experiment that the stresses and strains resulting from the interaction of such oscillations and the cutting operation considerably shorten the service life of the metal saw.

Furthermore, under these conditions one can only work with limited feed speed which is coordinated with the number of r.p.m. and which can not be too fast. As a result the efficiency of the entire saw apparatus is limited.

This limitation is true also for the level of cutting performance or, energy efficiency which, by way of example, is defined by a quotient which relates the cutting capacity to the motor's expenditure of energy.

OBJECT OF THE INVENTION

The principal object of my invention is to provide a cutting method which improves the above mentioned efficiency and to increase output capacity.

Another object of this invention is to increase the service life of the metal saw.

It is also an object of my invention to overcome the aforementioned drawbacks.

SUMMARY OF THE INVENTION

These objects are attained in accordance with this invention which comprises a method in which the feed speed and the number of r.p.m. of a metal saw are set high enough to render the tooth succession time small when compared to the oscillation time or period of the flange elastic deflection oscillation. This permits the sawtooth succession to hold the structural flange sufficiently securely and continuously in a deflected position.

The feed speed is set at such a level that the structural flange cannot be set free and thereby spring back.

Of course, and as is customary, a cutting fluid would be used, namely one intended for high cutting speeds which has a good wetting effect and a good cooling capacity.

Preferably the cutting speed for steel structural shapes as used in steel construction, will be higher than 60 m/min. and preferably even higher than 100 m/min.

It is understood that carbide tipped or other hard-metal tipped metal saws should preferably be used at high cutting speeds. The feed speed can then be set, for instance, at 2.50 m/min. or even higher.

If, during the process of the invention, the metal saw, while operating, shows any flutter vibrations, these are suppressed. This is achieved to quite an acceptable extent if, according to the invention, the metal saw is stabilized during its operation by means of clamping devices with low friction and, if necessary, cooled clamping jaws. These are positioned within the sawing range and possibly in a location diametrically opposite the cutting region.

The invention recognizes the fact that the back-spring of the elastically deflected structural flange and the resulting oscillations which occur during the sawing operation, must be suppressed. In accordance with the invention, the metal saw itself is used to suppress this back-spring. While keeping the number of saw teeth in mind, the number of r.p.m. is set so high that the deflected structural flange has, so to speak, no time to back-spring to a disturbing degree. In other words, that it should not back-spring across the entire distance of the elastic deflection. This means that the structural flange is locked into a deflected position.

If the structural flange back-springs a small part of the distance of the elastic deflection, between succeding saw teeth, it does not have a detrimental effect on the advantages of the process, namely the increased cutting speed and the increased feed speed, which improve efficiency while considerably lengthening the service life of the metal saw. However, this partial distance should be as small as possible, for instance a maximum of half the distance of the elastic deflection, preferably however only a quarter, a tenth or less of that distance.

With the aid of modern technical mechanics and electronic oscillation measurement it is easy to determine the frequency of the oscillation caused by the elastic deflection and thereby also the oscillation time:

for instance, one can measure the frequency by simulating the elastic deflection which occurs during the normal saw operation and then letting the structural flange swing out freely (this is without any sawing taking place and without having a saw there).

One can also calculate the frequency with modern mathematical aids (method of finite elements), given the specified geometry of the structural steel shape and the specified clamping.

In order to implement the process of the invention it is also possible to use a computer to regulate the r.p.m. of the metal saw in accordance with the locked in deflection of the structural flange.

To achieve this the deflection is measured, for instance with a laser or a stroboscope, during the operation of the metal saw. The number of r.p.m. is then controlled or regulated in such a manner that the deflection corresponds to a given value at which no disturbing oscillations will occur. It is understood that the saw apparatus is constructed in a manner that will permit the regulation of the number of r.p.m. as required by the invention, as well as the required feed speed.

Furthermore, metal saws are used which are designed and constructed in the customary manner. It is, however, recommended to optimize the first cut and the cutting angle in accordance with any individual requirements which may arise.

BRIEF DESCRIPTION OF THE DRAWING

The above and other objects, features and advantages of my present invention will become more readily apparent from the following description, reference being made to the accompanying highly diagrammatic drawing in which.

SPECIFIC DESCRIPTION

Figure 1:
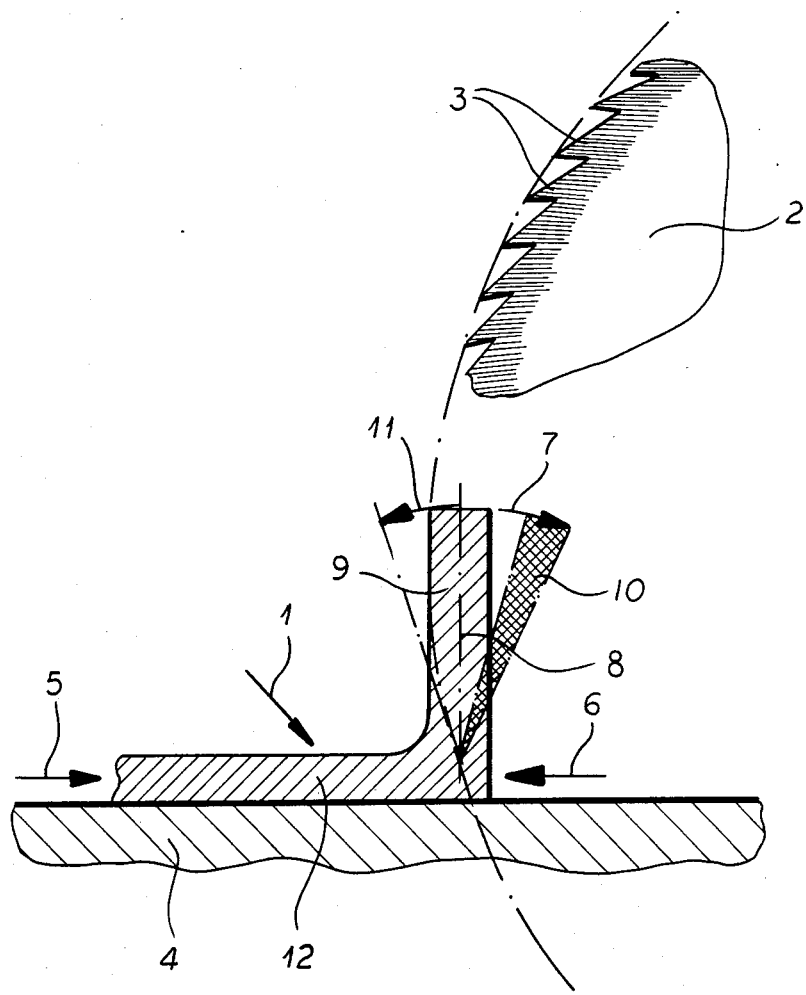
FIG. 1 is a diagrammatic detail view of a saw making a cross cut through a structural steel shape with a structural flange according to the invention.

The structural steel shape 1 shown in the drawing may be one with an angle cross section. It is positioned in a saw apparatus with a metal saw 2 which shows a specified number of saw teeth 3. The structural steel shape 1 lies on a table 4 or on a roller bed (conveyer) and is clamped by a suitable device such as a vise within range of the metal saw 2 against stationary equipment. The clamping forces are here indicated by arrows 5,6.

The metal saw 2 is operated with a specified number of r.p.m. Furthermore, it is directed with a specified feed speed toward the projected saw cut.

The cutting speed is determined by the number of r.p.m., the number of saw teeth 3 and the radius of the metal saw 2.

In FIG. 1 the arrow 7 to the right of the central dash-and-dot line 8 portrays in an exaggerated manner a forced elastic deflection of the structural flange 9. In the embodiment shown in the drawing, the deflection is to the right side. It is caused by the force exercised by the saw teeth 3 on the structural flange 9, which is to be sawed. The structural flange is impacted in this manner by the deflection-caused restoring forces and movements of the sawteeth 3 and by the tooth succession time which is determined by the number of r.p.m.

The number of r.p.m. and the feed speed are selected at a rate which will result in the structural flange 9 being locked into a deflected position by the saw teeth 3 following each other. This area is indicated by the cross-hatched section 10 in the drawing.

Thus the structural flange 9 cannot back-spring to the left to a random distance.

In order to effect this restraint, the oscillation time of the oscillation of the structural flange 9, which was activated by the elastic deflection, is ascertained, and the metal saw 2 is operated at a number of r.p.m. so as to have a tooth succession time which is small when compared to the oscillation time, i.e. is smaller than the oscillation period. The arrow 11 directed to the left, shows the full amplitude of the deflection.

If the structural steel shape is one which is commonly used in steel construction, one might, for instance, work with a feed speed of more than 2.50 m/min. Of course the cutting speed and the feed speed will be adjusted if the saw-cut severs the structural flange 9 and runs through the adjoining web 12.

The sawing operation in the described example has a considerable unidirectional component, which has been proven to be an advantage.

Figure 2:
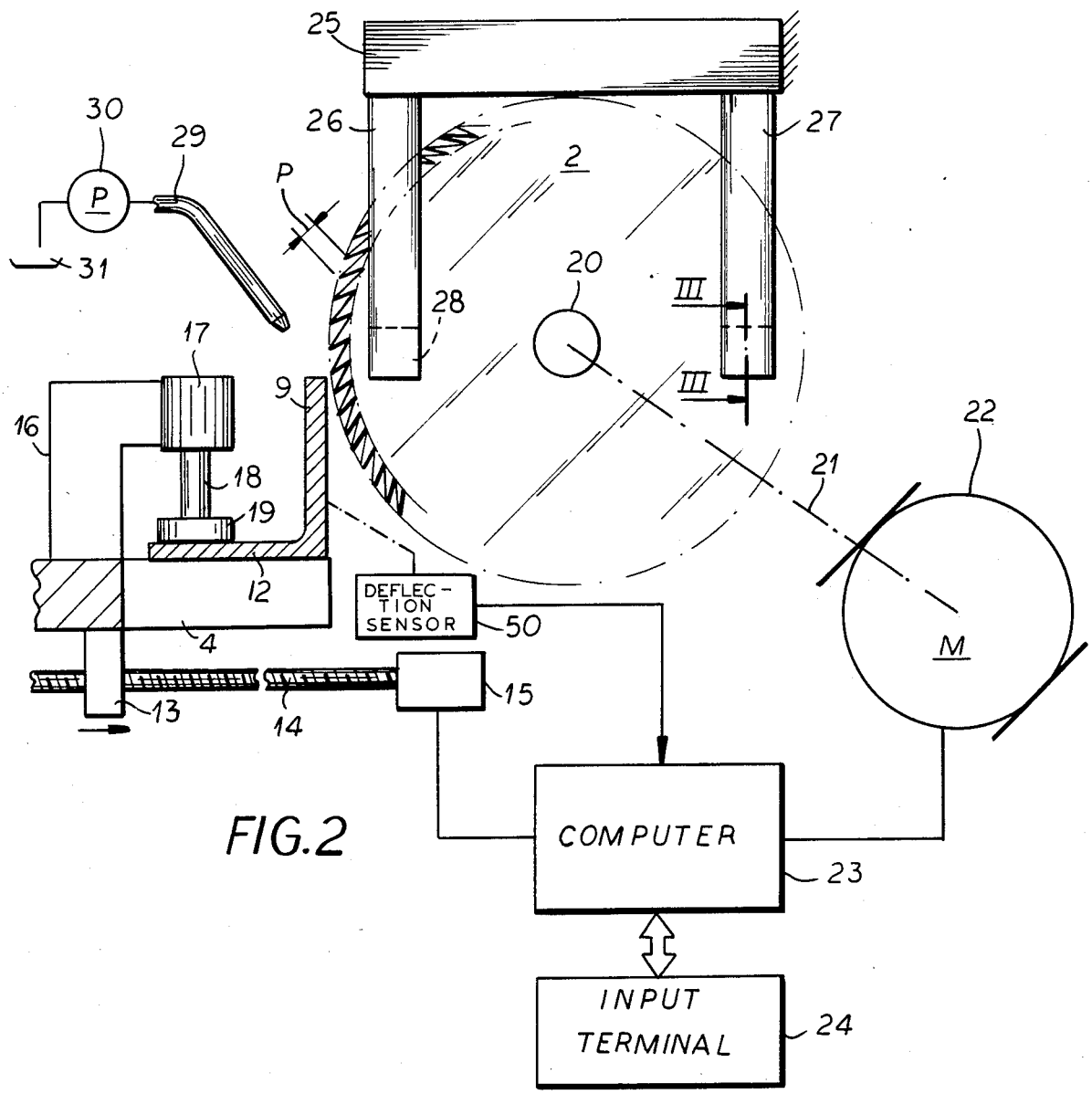
FIG. 2 is a diagrammatic elevational view further illustrating the invention.
Figure 3:
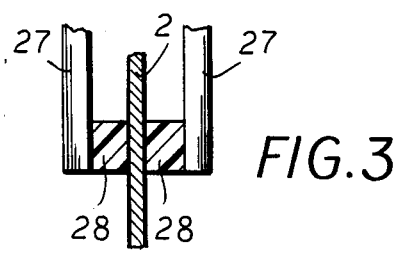
FIG. 3 is a section along line III—III of FIG. 2.

As can be seen from FIG. 2, the web 12 can be clamped by a shoe 19 of the piston 18 of a hydraulic clamping cylinder 17 mounted on a bracket 16 affixed to the plate 4 on which the workpiece is secured.

Here the workpiece 9,12 is moved by a motor 15, controlled by the computer 23, via a leadscrew 14 and a nut 13 engaged by the leadscrew to provide the feed speed.

The blade 2 is mounted on a shaft 20 driven by a motor 22 as represented at 21 and the motor 22 is also controlled by the computer to establish the r.p.m. of the blade.

Flutter is prevented by clamping pads 28 of low-friction material, e.g. polytetrafluoroethylene held by bars 26 and 27 and located diametrically opposite one another and having one set of pads 28 diametrically opposite the cutting location. A support 25 carries the bars 26,27.

Cutting coolant is supplied by a nozzle 29 connected to a pump 30 from a reservoir 31.

An input terminal 24 is connected to the computer 23 to introduce parameters of the sawing apparatus, namely, the number of teeth of the blade, the diameter or radius thereof from which the pitch P can be calculated, and the characteristics of the workpiece unless deflection sensor 50 is provided as shown here. The computer then controls the speed of the motor 22 and the cutting feed speed at motor 15 so that a constant deflection is maintained as previously described.

I claim:

1. A process for sawing a structural steel shape having at least one structural flange, in a saw apparatus with a rotary metal saw having a specified number of teeth, comprising the steps of:
   (a) clamping said structural steel shape within range of said metal saw;
   (b) rotating said metal saw at a specified number of r.p.m. to establish a speed of a cut by the number of r.p.m., the number of sawteeth, and the radius of said metal saw;
   (c) relatively displacing the clamped shape and the saw to feed said metal saw toward a projected sawcut at a specified feed speed;
   (d) determining a tooth succession time from the number of teeth and the number of r.p.m. of said metal saw;

(e) subjecting said structural flange to a forced elastic deflection by cutting engagement of said saw with said shape;

(f) determining an oscillation time of oscillation of said structural flange caused by the elastic deflection of said flange; and (g) controlling the r.p.m. of said saw and said feed speed such that the tooth succession time is small compared to the oscillation time, whereby said structural flange is held fast in a deflected position by said sawteeth following each other.

2. The process defined in claim 1 wherein the cutting speed is greater than 60 m/min.

3. The process defined in claim 1 wherein said cutting speed is greater than 100 m/min.

4. The process defined in claim 1 wherein said feed speed used is about 2.5 m/min.

5. The process defined in claim 1, further comprising the step of stabilizing said metal saw by holding it between clamping devices with low friction clamping jaws.

6. The process defined in claim 1, further comprising the step of regulating the number of r.p.m. of the metal saw by a computer to maintain a fixed deflection of the structural flange.

7. A method of cutting a flange of a steel structural shape, comprising the steps of:

(a) ascertaining the oscillation time of a flange of a steel structured shape for oscillations induced by a rotating metal sawblade with teeth successively engageable with said flange; and (b) controlling the speed of said blade and a speed with which said blade traverses said flange so that the tooth succession time exceeds said oscillation time and said flange is maintained deflected by said blade and prevented from oscillating during the cutting of said flange by said blade.

* * * * *